April 29, 1958 A. V. L. C. DEBRIE 2,832,599

HEAD SUPPORTS FOR MAGNETIC RECORDERS

Filed Jan. 25, 1955

INVENTOR:
ANDRÉ VICTOR LÉON
CLÉMENT DEBRIE
BY:
Michael S. Striker
Agt.

United States Patent Office 2,832,599

Patented Apr. 29, 1958

2,832,599

HEAD SUPPORTS FOR MAGNETIC RECORDERS

André Victor Leon Clement Debrie, Paris, France

Application January 25, 1955, Serial No. 483,993

Claims priority, application France February 9, 1954

5 Claims. (Cl. 274—4)

In magnetic recording and reproducing apparatus, the portion of the magnetic head which engages the film is subjected to wear. As soon as such wear reaches a predetermined extent the head is out of commission and should be replaced by a new one.

In order that the apparatus be not immobilized too long, it is necessary that the replacement of the failing part is quick and, moreover, possibly carried out by the user himself.

An object of the present invention is to provide a device which requires but a few seconds for removing the arm which carries the magnetic head so that the worn-out magnetic head may be easily replaced, such operation being limited to the mere replacement of a single part within easy reach without any subsequent adjustment being necessary.

Other and further objects and advantages of the invention will be apparent to those skilled in the art, from a consideration of the following description of one embodiment of the invention, shown by way of example, in the accompanying drawings. This embodiment is applied to the construction of platen with two magnetic heads adapted to be attached and centered on a projector already equipped with a photoelectric sound scanning device which subsists and alternately may be used during magnetic recording. In these drawings.

Figure 2:
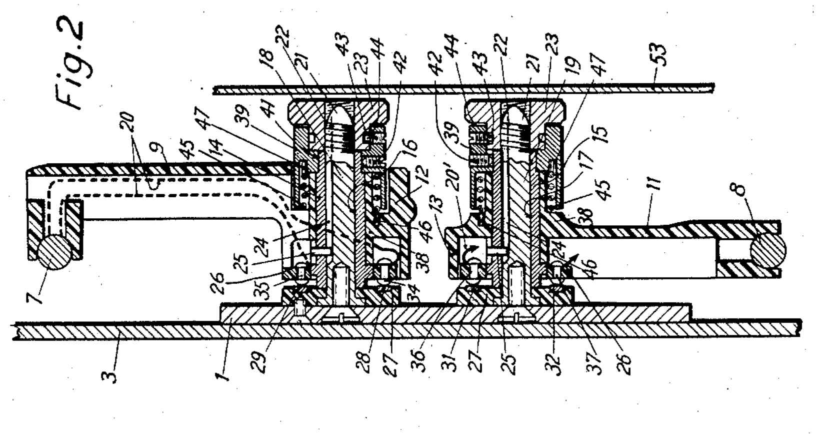
Fig. 2 is a fragmentary transverse section containing the axes of the supports for the magnetic heads which, for the sake of clarity in the drawing, are arranged in the plane of said axes and opposing each other.

A platen or support 1 is secured as by means of screws 2 to the wall 3 of the projector which, in the instance illustrated, is pierced with a circular opening 4 through which extends the scanning photoelectric cell 10 when the projector is used with photographic tracks. 5 denotes the sound scanning drum on which is the sound track carrying film 6 over a large portion of the periphery thereof.

In order to scan, record and obliterate the magnetics tracks on the film, use is made of two magnetic heads 7 and 8 respectively which are mounted as detachable heads according to the invention at the ends of corresponding pivoting arms 9 and 11 so designed that the magnetic heads engage the film as at locations *a* and *b* clearing between themselves, if need be, the passage for the scanning luminous beam between the source and the cell 10 extending through the opening 4. The arms 9 and 11, preferably made of an insulating molded material are, for instance, U-shaped in cross-section and have passages in the vicinity of their magnetic heads for accommodating electrical wires such as 20.

At their ends opposite the magnetic heads, these arms are terminated into hub portions 12 and 13 respectively, adapted to rotate each on a first or inner member shown in the drawings as sleeves 14 or 15, respectively.

These sleeves 14, 15, in the present instance, are identical with each other; they are provided with a bore 16 and 17 respectively, coaxial with their cylindrical surface upon which rotate the parts 12 and 13, and they are received on stationary stud shafts 18 and 19, respectively secured to the platen 1 at right angles with respect thereto.

The free ends 21 of these shafts are tapering and screw-threaded as at 22, for the purpose of receiving retaining means shown in the drawings as knurled thumb knobs 23 adapted to clamp the hubs. Each shaft is provided with a longitudinal groove 24 in which may slide a finger 25 secured to the sleeves and preventing any rotational movement of said sleeves relative to the shaft.

Near the platen 1, each sleeve has a flange 26 located some distance from its end and above an insulating washer 27. Said washers encircle respectively the base of the corresponding shaft 18 or 19 and carry electric contacts 28, 29 and 31, 32, respectively, connected to a connection box diagrammatically illustrated as at 33, through the medium of connecting wires 30, 30'.

The flanges 26 carry contact pieces 34, 35 and 36, 37, respectively, which are insulated with respect to said flanges and respectively connected to the magnetic heads 7 and 8 through the medium of wires 20 and 20'.

The contact pieces 34 to 37 also called first contact means are pressed against the corresponding resilient contacts or second contact means 28 to 32 when the corresponding sleeves are positioned in place, pressed and clamped against the washers 27 by the knurled thum knob.

The hub portions 12 and 13 of the insulated arms which carry the magnetic heads have a cylindrical portion 38 mounted for rotational movement on the respective sleeve and held against longitudinal movement between the flange 26 and an exteriorly cylindrical ring 39, said rings 39 are each received on and secured to a reduced bearing portion of the sleeve upon which they are endwise positioned and maintain the axial portions 38 against longitudinal movement.

The rings 41 are secured to the corresponding sleeve by means of pointed set screws 42 and, therefore, are also prevented against rotation.

The knurled thumb nuts 23 are each retained in these rings by a cylindrical trunnion provided with an annular groove 43 in which is freely engaged a cylindrical pin 44 screwed in the ring 41.

Housed in cylindrical recess counterbored in each ring 41 is a helical spring 45 the end portions of which are bent in a direction parallel with the axis of the shaft and received in blind holes 46 and 47 respectively drilled in the axial portion of the arm and the ring 39 respectively.

The spring 45 thus urges the corresponding arms to rotate on their stationary sleeves and to apply with a constant pressure the corresponding magnetic heads against the film 6 travelling over the scanning drum 5.

Figure 1:
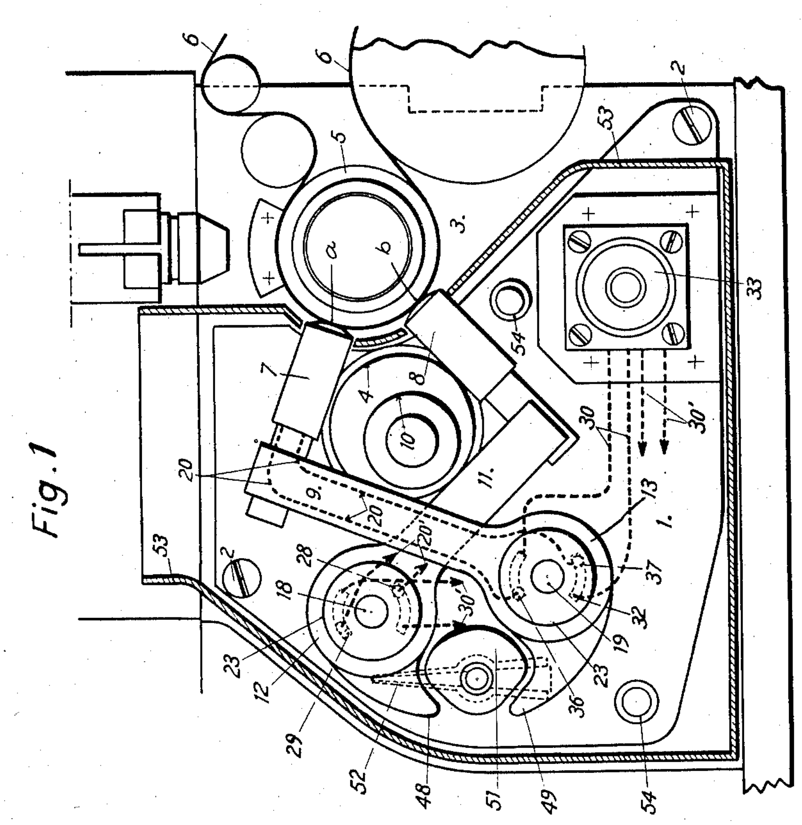
Fig. 1 is a lateral elevational view of the recording unit for recording, reproducing or obliterating in connection with a magnetic track.

The arms 9 and 11 are longitudinally shifted one with respect to the other on their axial portions 38 and, for this purpose, their bodies 12, 13 are different in height so that the arms may cross each other as illustrated in Fig. 1, while the magnetic heads have their axes in a common plane at right angles to the axis of the drum 5, with a view to recording, obliterating or reproducing the same tracks on the film.

These arms 9 and 11 have extensions such as 48 and 49 respectively, between which a cam 51 is adapted to move as illustrated in Fig. 1. This cam is manually operable by means of a handle 52 diagrammatically shown in dotted lines and rigid on the cam-shaft which extends through a bearing secured for instance to a cover or casing 53, itself secured to the platen 1 and wall 3 as by means of screws threadedly engaged into the wall 3 through holes 54 of the platen 1.

In the position shown, which corresponds to recording, the obliterating head 7 and the scanning head 8 are both applied against the film on the drum 5 under the action of the springs 45 arranged upon their respective arms.

If the cam 51 is rotated 90° clockwise, the obliterating head 7 is raised out of engagement with the film and the scanning head 8 is in scanning position.

A further 90° rotation of the cam 51, in the same direction, causes it to simultaneously engage both extensions 48 and 49. Both magnetic heads are moved away and held spaced from the film whereby electro-optical scanning may be carried out by means of the cell 10.

Obviously, the rotational movement of the cam may be accompanied, in known manner, with any interruption or establishment of the corresponding electric connections.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

What I claim is:

1. In a projector apparatus or the like having a drum for a film with a magnetic sound track, in combination, a support; at least one stud shaft mounted on said support; head carrying means comprising a first member mounted on said stud shaft for sliding movement in axial direction thereof, and a second member turnably mounted on said first member for turning movement about the axis of said stud shaft; a magnetic head carried by said second member; a first contact means carried by said first member and electrically connected to said head; a second contact means mounted on said support and abutting against said first contact means; spring means for urging said second member in a direction for placing said head mounted thereon in contact with the sound track on the film; and retaining means for releasably retaining said head carrying means on said stud shaft, said head carrying means, said head, and said first contact means together with said spring form one unit which may be easily removed from said stud shaft upon release of said head carrying means by said retaining means.

2. In a projector apparatus or the like having a drum for a film with a magnetic sound track, in combination, a support; at least one stud shaft mounted on said support; head carrying means comprising an inner member mounted on said stud shaft for sliding movement in axial direction thereof, and an outer member turnably mounted on said inner member for turning movement about the axis of said stud shaft; a magnetic head carried by said outer member; first contact means carried by said inner member and electrically connected to said head; second contact means mounted on said support and abutting against said first contact means; spring means mounted between said inner member and said outer member and being connected at one end thereof to said inner member and at the other end thereof to said outer member for urging said outer member in a direction for placing said head mounted thereon in contact with the sound track on the film; and retaining means for releasably retaining said head carrying means on said stud shaft, said head carrying means, said head, and said first contact means together with said spring form one unit which may be easily removed from said stud shaft upon release of said head carrying means by said retaining means.

3. In a projector apparatus or the like having a drum for a film with a magnetic sound track, in combination, a support; at least one stud shaft mounted on said support; head carrying means comprising a sleeve member surrounding said stud shaft and coaxial therewith and being mounted on said stud shaft for sliding movement in axial direction thereof, and an outer member turnably mounted on said sleeve member for turning movement about the axis of said stud shaft, said sleeve member comprising a lower tubular part being formed with a flange, and an upper annular part fastened to said tubular part spaced from the flange thereof, and said outer member being held on said tubular part of said sleeve member between said flange and said annular part; a magnetic head carried by said outer member; first contact means carried on said flange and electrically connected to said head; second contact means mounted on said support and abutting against said first contact means; spring means mounted between said annular part and said outer member and being connected at one end thereof to said annular part and at the other end thereof to said outer member for urging said outer member in a direction for placing said head mounted thereon in contact with the sound track on the film; and retaining means for releasably retaining said head carrying means on said stud shaft, said head carrying means, said head, and said first contact means together with said spring form one unit which may be easily removed from said stud shaft upon release of said head carrying means by said retaining means.

4. In a projector apparatus or the like having a drum for a film with a magnetic sound track, in combination, a support; at least one stud shaft fixedly mounted on one end thereof to said support and being provided with a screw thread on the other end thereof; head carrying means comprising an inner member mounted on said stud shaft for sliding movement in axial direction thereof, and an outer member turnably mounted on said inner member for turning movement about the axis of said stud shaft; a magnetic head carried by said outer member; first contact means carried by said inner member and electrically connected to said head; second contact means mounted on said support and abutting against said first contact means; spring means mounted between said inner member and said outer member and being connected at one end thereof to said inner member and at the other end thereof to said outer member for urging said outer member in a direction for placing said head mounted thereon in contact with the sound track on the film; and retaining means screwed onto said other end of said stud shaft for releasably retaining said head carrying means on said stud shaft, said head carrying means, said head, and said first contact means together with said spring form one unit which may be easily removed from said stud shaft upon release of said head carrying means by said retaining means.

5. In a projector apparatus or the like having a drum for a film with a magnetic sound track, in combination, a support; at least one stud shaft fixedly mounted on one end thereof to said support and being provided with a screw thread on the other end thereof; head carrying means comprising an inner member mounted on said stud shaft for sliding movement in axial direction thereof, and an outer member turnably mounted on said inner member for turning movement about the axis of said stud shaft and being formed with an extension projecting laterally therefrom, said extension having a cam face; a magnetic head carried by said outer member; first contact means carried by said inner member and electrically connected to said head; second contact means mounted on said support and abutting against said first contact means; spring means mounted between said inner member and said outer member and being connected at one end thereof to said inner member and at the other end thereof to said outer member for urging said outer member in a direction for placing said head mounted thereon in contact with the sound track on the film; retaining means screwed onto said other end of said stud shaft for releasably retaining said head carrying means on said stud shaft, said head carrying means, said head, and said first contact means together with said spring form one unit which may be easily removed from said stud shaft upon release of said head carrying means by said retaining means; and cam means mounted on said support for movement between a first position in which said cam means are spaced from said cam face on said extension and a second position in which said cam means engage said cam face for turning said outer member against the force of said spring means to move the head mounted on said outer member away from the film.

References Cited in the file of this patent

UNITED STATES PATENTS

| | | |
|---|---|---|
| 2,003,434 | Goldhammer | June 4, 1935 |
| 2,676,023 | Isom | Apr. 20, 1954 |
| 2,701,718 | Allen | Feb. 8, 1955 |
| 2,705,640 | Del Valle | Apr. 5, 1955 |